(12) United States Patent
Matsuzaki et al.

(10) Patent No.: US 12,090,944 B2
(45) Date of Patent: Sep. 17, 2024

(54) OCCUPANT PROTECTION DEVICE

(71) Applicant: TOYODA GOSEI CO., LTD., Kiyosu (JP)

(72) Inventors: Yuji Matsuzaki, Kiyosu (JP); Akira Yasuda, Kiyosu (JP); Yuto Noda, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/360,374

(22) Filed: Jul. 27, 2023

(65) Prior Publication Data
US 2024/0067118 A1 Feb. 29, 2024

(30) Foreign Application Priority Data

Aug. 25, 2022 (JP) .................................. 2022-134166

(51) Int. Cl.
*B60R 21/207* (2006.01)
(52) U.S. Cl.
CPC .................................. *B60R 21/207* (2013.01)
(58) Field of Classification Search
CPC .............................. B60R 21/207; B60R 21/18
See application file for complete search history.

(56) References Cited

U.S. PATENT DOCUMENTS

| 5,062,662 A * | 11/1991 | Cameron | B60R 21/268 |
| | | | 280/801.1 |
| 2015/0069741 A1 * | 3/2015 | Shimazu | B60R 21/233 |
| | | | 280/729 |
| 2019/0299899 A1 * | 10/2019 | Einarsson | B60R 21/233 |
| 2020/0122668 A1 * | 4/2020 | Ozaki | B60R 21/237 |

(Continued)

FOREIGN PATENT DOCUMENTS

| JP | 6380196 B2 * | 8/2018 |
| JP | 2020-66425 A | 4/2020 |
| JP | 2021-54251 A | 4/2021 |

(Continued)

OTHER PUBLICATIONS

Higuchi, WO-2011129214-A1, Machine Translation of Specification (Year: 2011).*

(Continued)

*Primary Examiner* — Amy R Weisberg
*Assistant Examiner* — Matthew Joseph Ganci
(74) *Attorney, Agent, or Firm* — Posz Law Group, PLC

(57) ABSTRACT

An occupant protection device protects an occupant seated on a seat, in which an airbag is held in a holding body disposed in a periphery of a hip portion of the occupant. The airbag has a bag main body, and a conduit portion that causes an inflating gas discharged from an inflator to flow into the bag main body. The bag main body is held in the holding body as a completely folded body, folded using a front-rear reduction folding such that a width dimension in a front-rear direction is reduced from a preliminary folded bag. The (Continued)

completely folded body is formed by a lower side rolled region, formed by a lower side region of the preliminary folded bag being wound from a lower edge side, being stacked on an upper side rolled region, formed by an upper side region of the preliminary folded bag.

5 Claims, 12 Drawing Sheets

(56) References Cited

U.S. PATENT DOCUMENTS

2021/0094496 A1    4/2021    Tanaka et al.

FOREIGN PATENT DOCUMENTS

| WO | WO-0100456 A1 * | 1/2001 | ............ B60R 21/18 |
| WO | WO-2011129214 A1 * | 10/2011 | ............ B60R 21/18 |

OTHER PUBLICATIONS

Miura, JP-6380196-B2, Machine Translation of Specification (Year: 2018).*

Lewis, WO-0100456-A1, Machine Translation of Specification (Year: 2001).*

* cited by examiner

Schematic Sectional View at A-A

OCCUPANT PROTECTION DEVICE

CROSS REFERENCE TO RELATED APPLICATIONS

The present application claims priority from Japanese Patent Application No. 2022-134166 of Matsuzaki et al., filed on Aug. 25, 2022, the entire disclosures of which are incorporated herein by reference.

BACKGROUND

1. Technical Field

The present disclosure relates to an occupant protection device for protecting an occupant seated on a seat.

2. Description of Related Art

As an existing occupant protection device, there is an occupant protection device of a configuration in which a folded airbag is housed in a region of a lap belt wound around a periphery of a hip portion in a seatbelt, and an occupant seated on a seat is protected by the inflated airbag, as shown in JP2020-66425A. Specifically, the existing occupant protection device is such that the airbag includes a bag main body which is disposed in such a way as to cover a front of the occupant when inflation is completed, and a conduit portion that causes an inflating gas discharged from an inflator to flow into the bag main body.

The existing occupant protection device is such that an external form of the bag main body when inflation is completed is an approximate triangular prism form whose axial direction approximately follows a left-right direction. Further, the bag main body, which is folded and housed in a region of the lap belt, inflates in such a way as to protrude forward and upward owing to inflating gas being caused to flow into an interior thereof. The existing occupant protection device is of a configuration in which an upper body of the occupant is protected by the bag main body when inflation is completed. Because of this, the bag main body is preferably caused to inflate in such a way as to swiftly cover the front of the upper body.

SUMMARY

An occupant protection device of the present disclosure is an occupant protection device for protecting an occupant seated on a seat, and includes the following:

an inflator;

a holding body disposed in a periphery of a hip portion of the occupant; and an airbag that is held in the holding body and has a bag main body, which inflates while protruding forward and upward from the holding body, whose external form when inflation is completed is an approximate triangular prism form whose axial direction approximately follows a left-right direction, and which is disposed in such a way as to cover a front of the occupant when inflation is completed; and a conduit portion, which is connected to the inflator, and causes an inflating gas discharged from the inflator to flow into the bag main body via a communication hole, wherein the bag main body has a front wall portion which is disposed on a front side separated from the occupant when inflation is completed, and a rear wall portion and a lower wall portion which are disposed on the occupant side when inflation is completed, and is of a configuration held in the holding body in a state of a completely folded body folded using a front-rear reduction folding such that a width dimension in front-rear direction is reduced from a state of a preliminary folded bag disposed in such a way as to be stacked on the rear wall portion and the lower wall portion while a region of the front wall portion is flatted over approximately a whole region, and the completely folded body is formed by a lower side rolled region, which is formed by a lower side region forming a side of the preliminary folded bag lower than the conduit portion being wound from a lower edge side toward the front wall portion side, being stacked on an upper side rolled region, which is formed by an upper side region forming a side of the preliminary folded bag upper than the conduit portion being wound from an upper edge side toward the front wall portion side.

DETAILED DESCRIPTION

Preferred embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
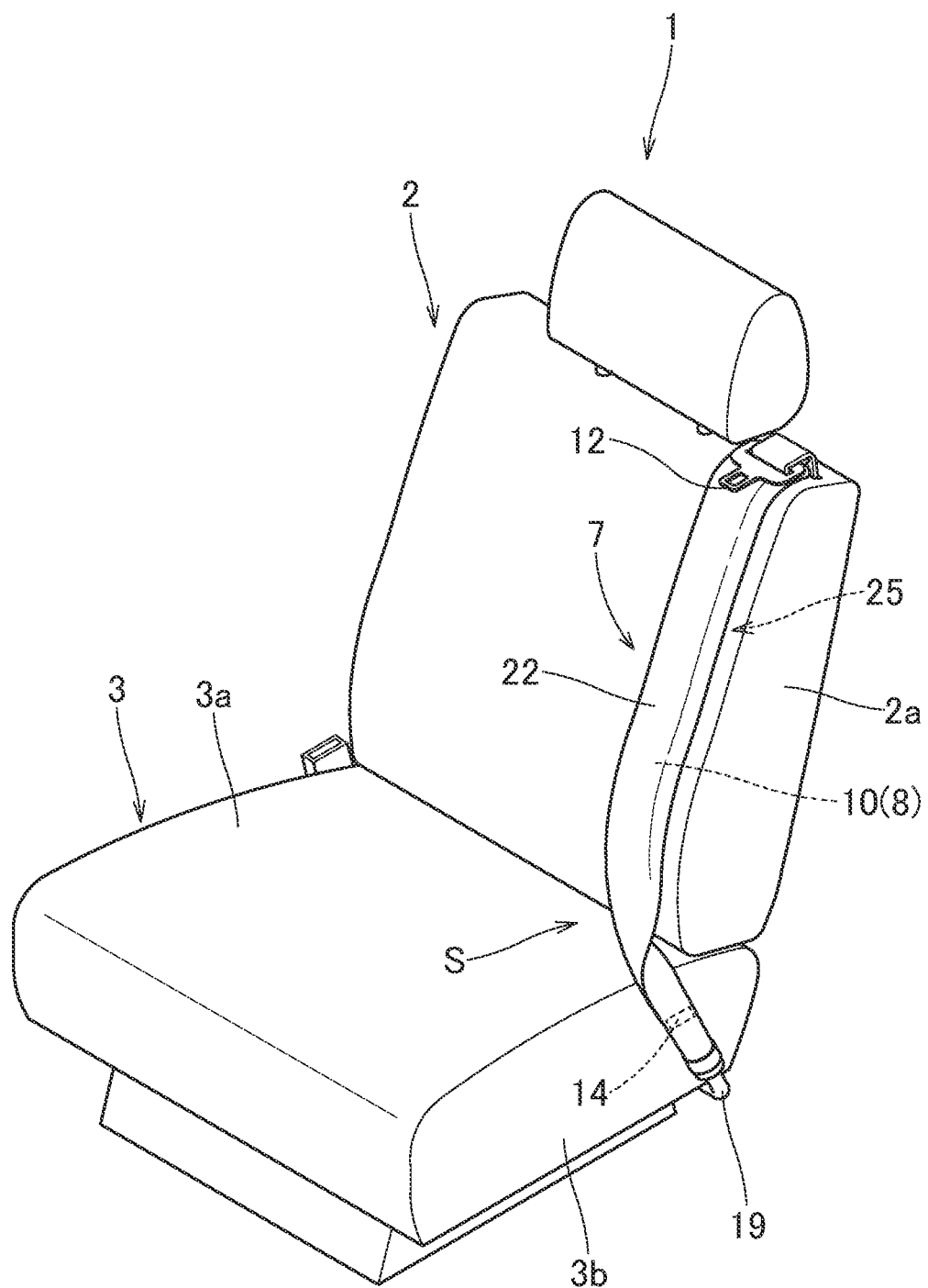
FIG. 1 is a perspective view of a seat in which an occupant protection device that is one embodiment of the present disclosure is mounted.
Figure 2:
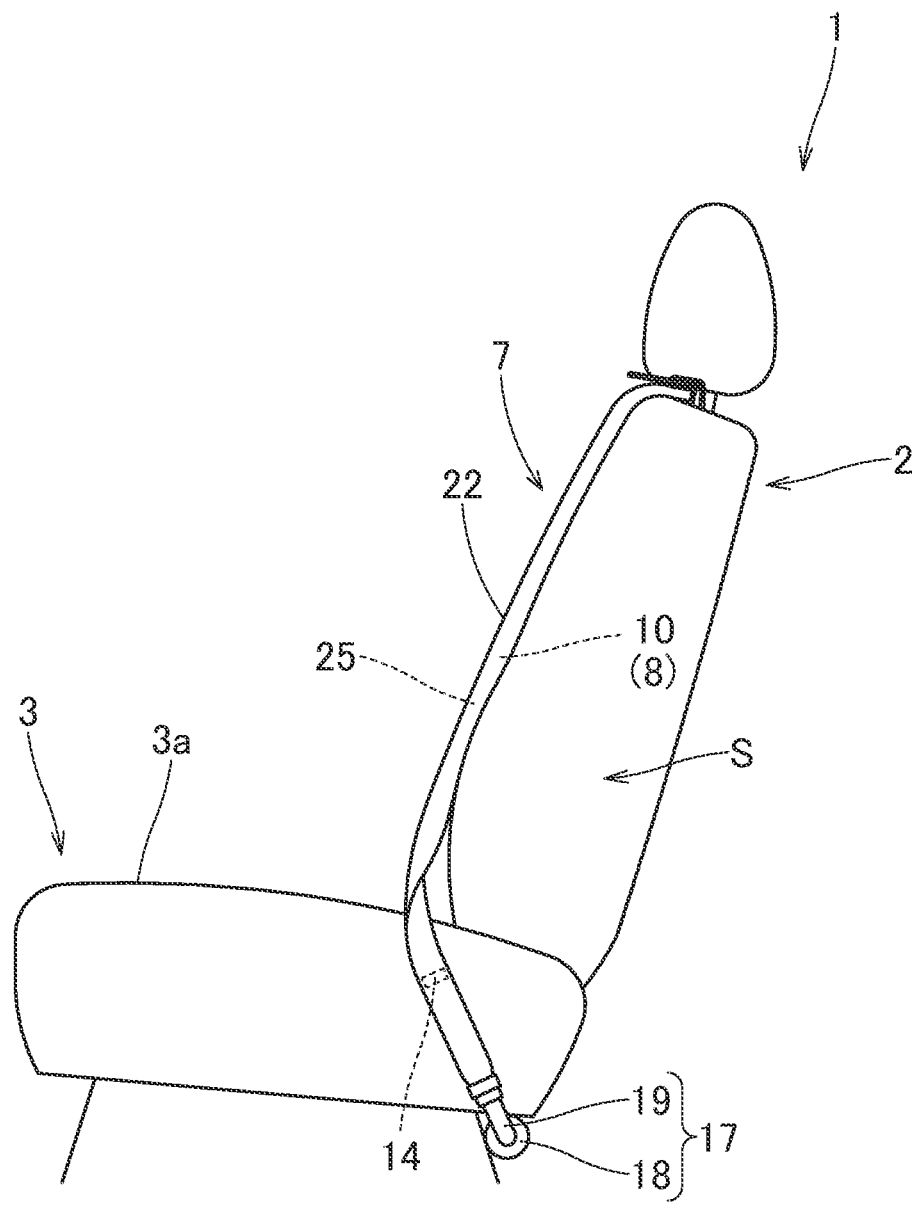
FIG. 2 is a side view of the seat of FIG. 1.
Figure 3:
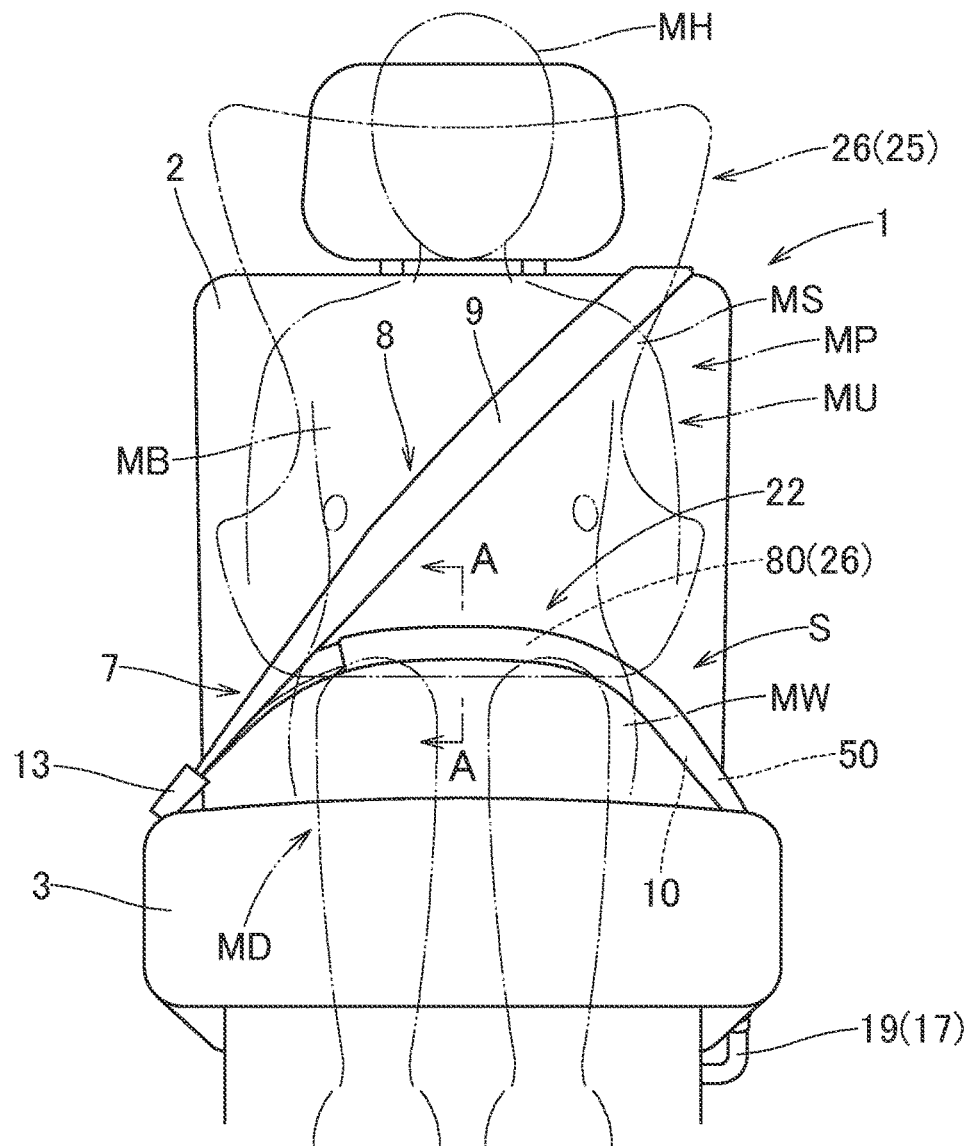
FIG. 3 is a front view of the seat of FIG. 1, and shows a state where a seatbelt is worn.
Figure 3:
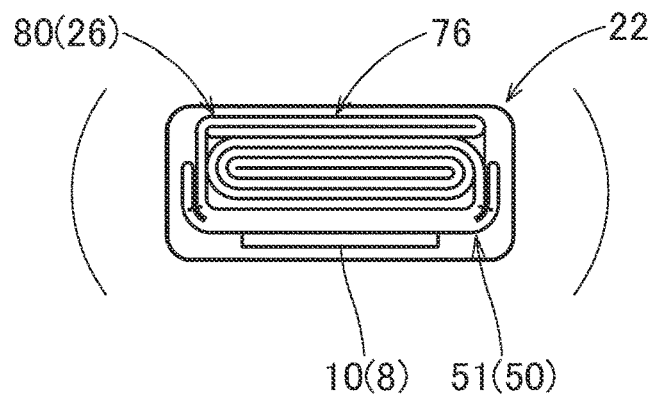

Hereafter, an embodiment of the present disclosure will be described, based on the drawings. As shown in FIGS. 1 to 3, an occupant protection device S of the embodiment is mounted in a seat 1 of a vehicle. The occupant protection device S includes a seatbelt 7 configuring a holding body that holds an airbag 25, the airbag 25, and an inflator 17 that supplies an inflating gas to the airbag 25. The seat 1 includes a backrest portion 2 and a seat portion 3. In the embodiment, front-rear, up-down, and left-right directions coincide with front-rear, up-down, and left-right directions of the seat 1, unless specifically stated otherwise.

In the case of the embodiment, the seatbelt 7 is mounted in the seat 1, and includes a belt main body 8 for restraining an occupant MP seated on the seat 1, a tongue plate 12 attached to the belt main body 8, and a buckle 13 for causing the tongue plate 12 to be coupled. One end of the belt main body 8 is caused to engage with a take-up shaft of an unshown retractor disposed inside the backrest portion 2. Another end side of the belt main body 8 is engaged to the left of a rear end 3b of the seat portion 3 of the seat 1 by an anchor member 14 (refer to FIGS. 1 and 2). Specifically, the belt main body 8 is disposed in such a way as to be exposed to an exterior from an upper end left edge side of the backrest portion 2. In the case of the embodiment, the belt main body 8 is configured in such a way that, in a state where the occupant MP is not seated, a lap belt 10 acting as a holding body in which the airbag 25 is caused to be held is exposed on a front face of the backrest portion 2, as shown in FIGS. 1 and 2. Specifically, in a state wherein the occupant MP is not seated, the lap belt 10 is exposed on the front face of the backrest portion 2 in such a way as to approximately follow the up-down direction on a left edge 2a side of the backrest portion 2, as shown in FIG. 1. The belt main body 8 has the lap belt 10, and a shoulder belt 9 housed inside the backrest portion 2. In a state where the tongue plate 12 is coupled to the buckle 13 when the occupant is seated (when worn by the occupant), the lap belt 10 is disposed in such a way as to approximately follow the left-right direction between the anchor member 14 and the buckle 13, thereby restraining a lower body MD (hip portion MW, pelvic region) of the occupant MP. The shoulder belt 9, when worn by the occupant, is disposed obliquely extending from the upper end left edge side of the backrest portion 2 to the buckle 13, thereby restraining an upper body MU (from a shoulder portion MS to a chest portion MB) of the occupant MP (refer to FIG. 3). Further, in the case of the embodiment, the lap belt 10, which is disposed in front of the hip portion MW of the occupant MP seated on the seat 1, and a cover 22 to be described hereafter configure a holding body in which the folded airbag 25 is housed and held. The seatbelt 7 is such that the unshown retractor disposed inside the backrest portion 2 has a pretensioner mechanism.

The inflator 17 is mounted in the seat 1. Specifically, in the case of the embodiment, the inflator 17 is disposed in a position below a seat face 3a in the seat 1. As shown in FIG. 2, the inflator 17 includes an inflator main body 18 (a detailed depiction is omitted), whose external form is approximately cylindrical, and a pipe portion 19, which extends from the inflator main body 18 and supplies inflating gas to the airbag 25. The pipe portion 19 extends from the inflator main body 18, and is disposed in such a way that a leading end is positioned in a vicinity of a boundary region between the seat portion 3 and the backrest portion 2 to the left of the seat 1. The leading end of the pipe portion 19 is connected to a conduit portion 50, to be described hereafter, of the airbag 25 by utilizing a clamp 20 (refer to FIG. 12). In the case of the embodiment, the inflator 17 (the inflator main body 18) is set in such a way that an operation start is later than that of the pretensioner mechanism of the seatbelt 7. This is in order to regulate a pulling out of the belt main body 8 of the seatbelt 7 accompanying an inflation of the airbag 25. Specifically, the inflator 17 is set in such a way as to operate 5 ms after an operation of the pretensioner mechanism of the seatbelt 7.

With the lap belt 10 of the seatbelt 7 as a holding body, the airbag 25 is disposed folded into an elongated form, while being held in the lap belt 10, with a periphery covered by the cover 22. Specifically, the airbag 25 is disposed in a region of the lap belt 10, with the periphery covered by the cover 22, in such a way as to be stacked on an upper face side of the lap belt 10 when the seatbelt 7 is worn, with the bag main body 26, to be described hereafter, in a state of a completely folded body 80 (refer to FIG. 3). In other words, the airbag 25 (the bag main body 26) is housed in a gap between the lap belt 10 and the cover 22 in the state of the completely folded body 80. Also, in the kind of non-worn state shown in FIG. 1, the airbag 25 is disposed on a back face side (the backrest portion 2 side) of the lap belt 10 exposed on the front face of the backrest portion 2. The cover 22 is configured of a sheet body having flexibility, and is configured in such a way that a predetermined place is ruptured when the airbag 25 starts to inflate, enabling the bag main body 26 of the airbag 25 to protrude.

Figure 4:
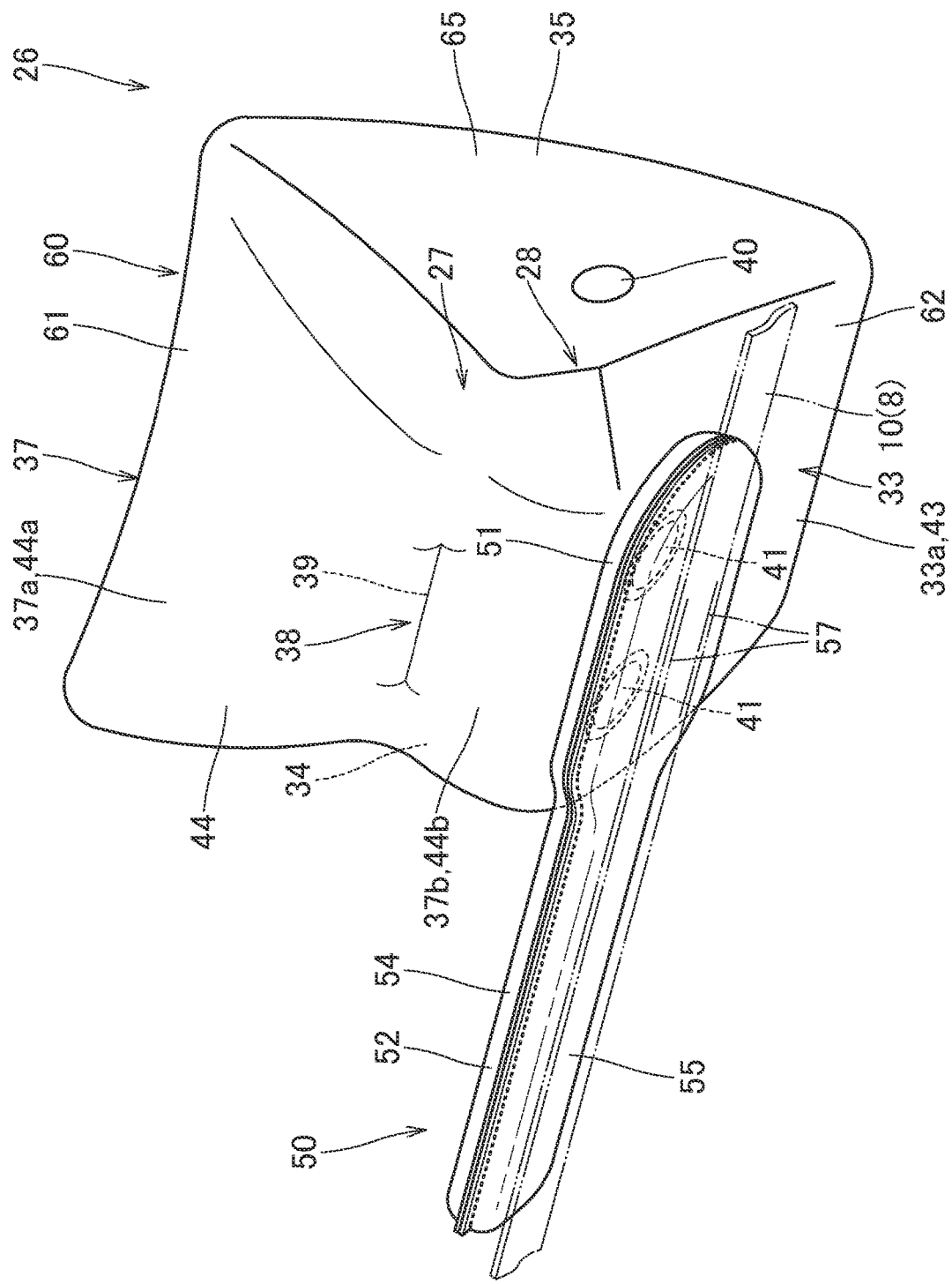
FIG. 4 is a schematic perspective view showing an airbag used in the occupant protection device of the embodiment in a state inflated alone.
Figure 5:
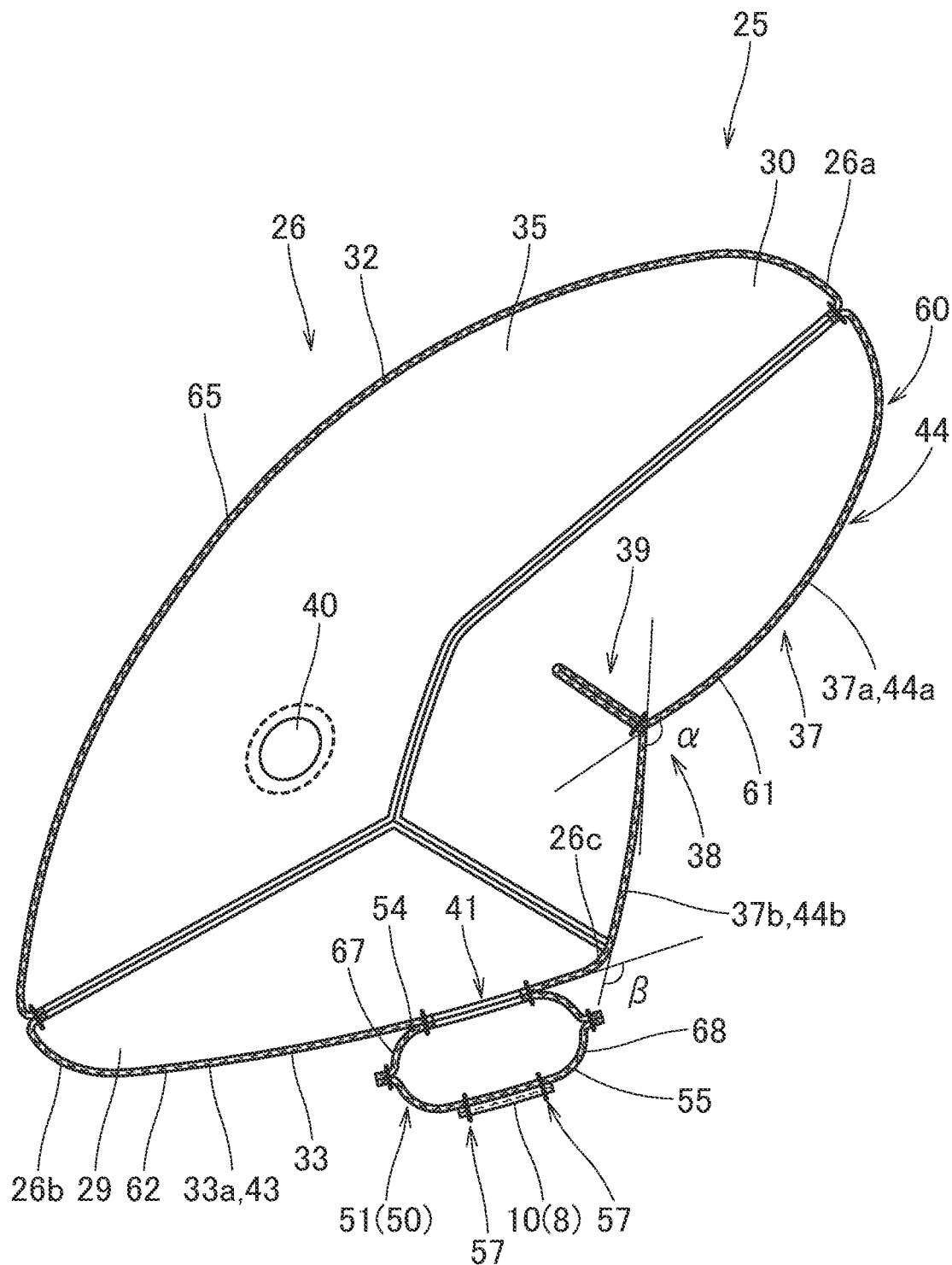
FIG. 5 is a schematic vertical sectional view of the airbag of FIG. 4.

The airbag 25 is formed as a bag formed of a sheet body having flexibility. As shown in FIGS. 4 and 5, the airbag 25 includes the bag main body 26 and the conduit portion 50 which is connected to the inflator 17 and causes inflating gas to flow into the bag main body 26.

Figure 11:
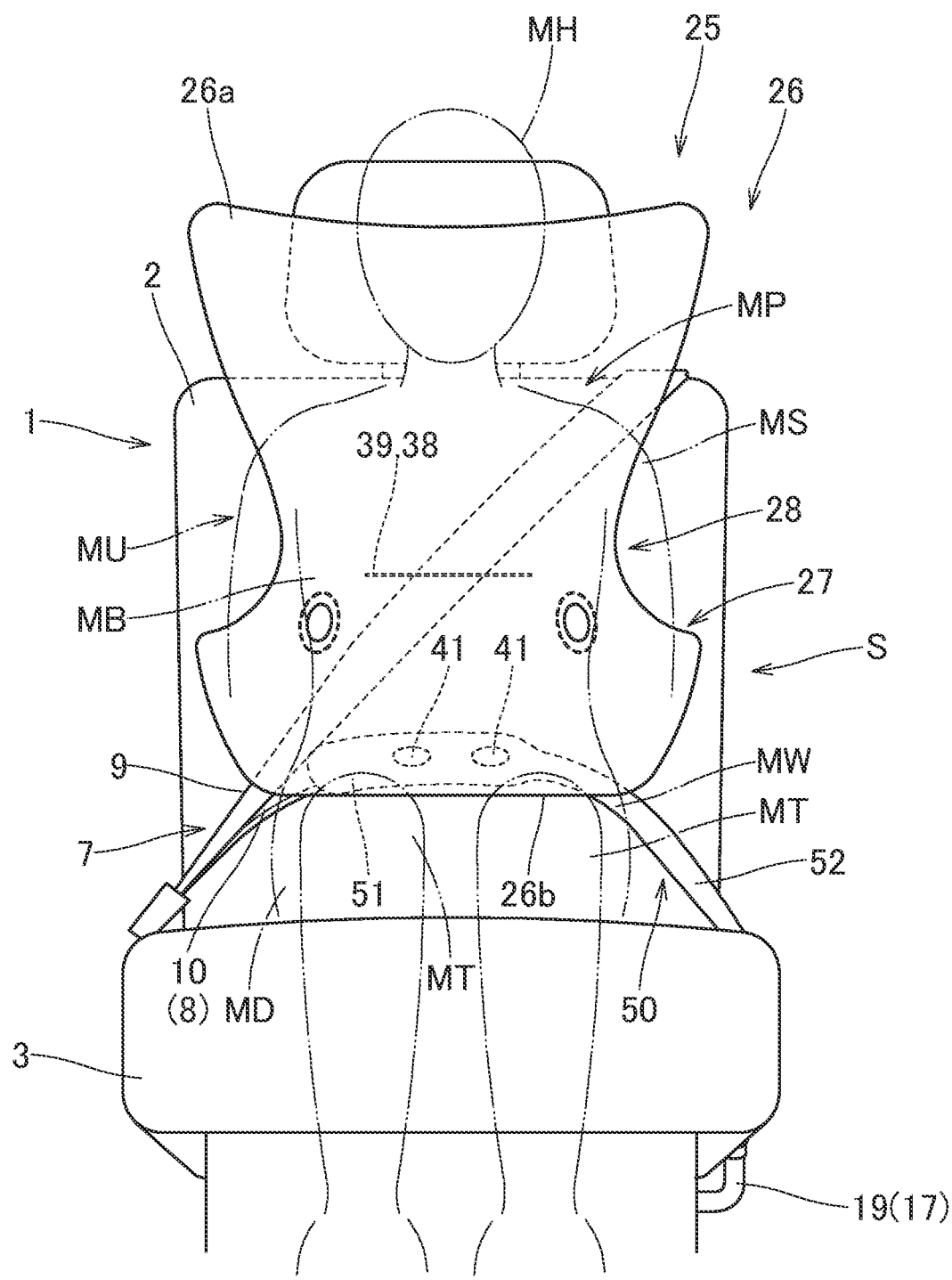
FIG. 11 is a front view of the seat in a state where inflation of the airbag is completed in the occupation protection device of the embodiment.
Figure 12:
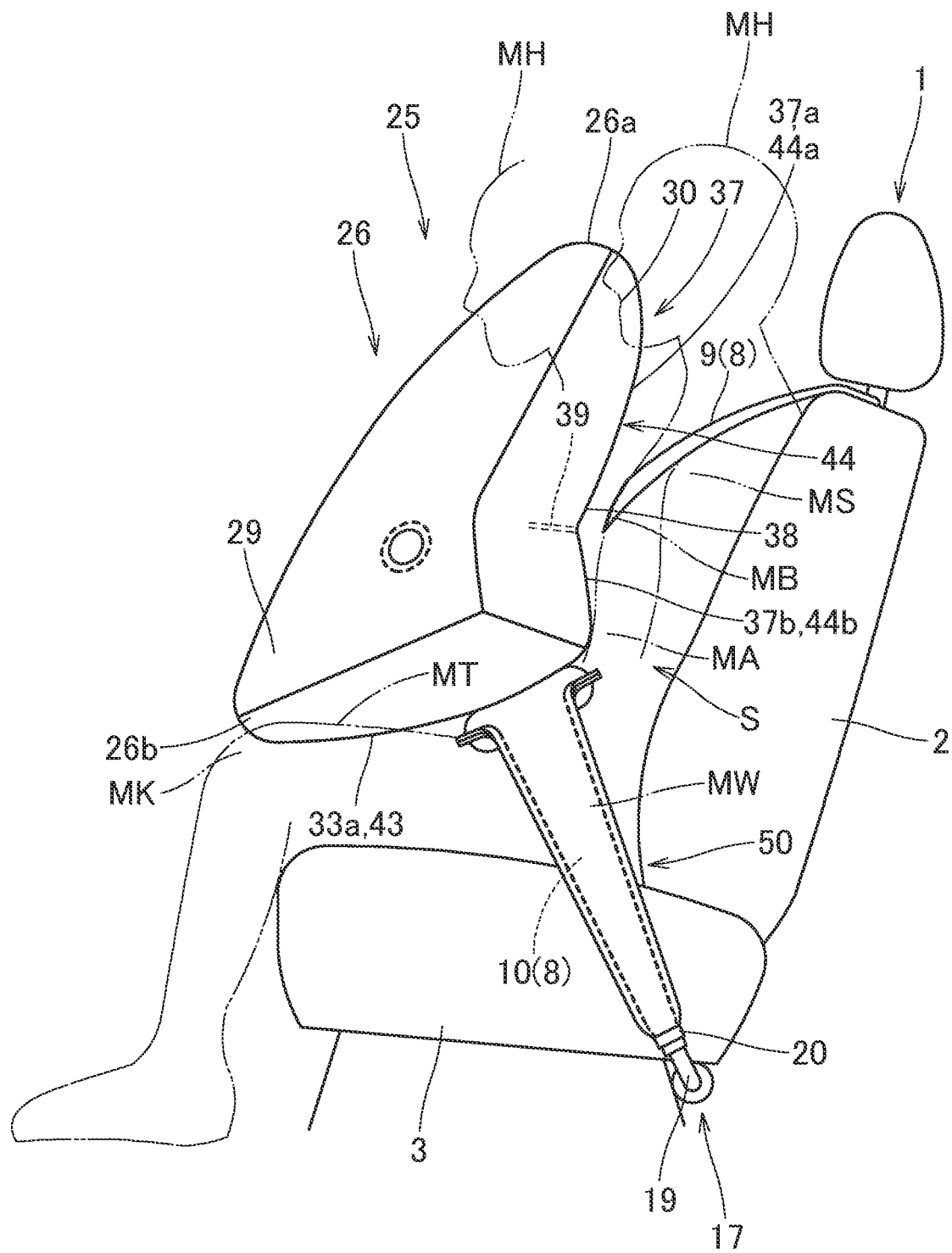
FIG. 12 is a side view of the seat in a state where inflation of the airbag is completed in the occupation protection device of the embodiment.

In the case of the embodiment, an external form of the bag main body 26 when inflation is completed is an approximate triangular prism form whose axial direction approximately follows the left-right direction, and which becomes wider front-to-rear toward a lower end side, as shown in FIGS. 5 and 12. Also, in the embodiment, the bag main body 26 is of a form bent in an up-down intermediate region in such a way that a region on an upper end 26a side when inflation is completed is oriented toward the rear, which is the occupant MP side. Furthermore, in the embodiment, a form of the bag main body 26 in a state seen from a front-rear direction side when inflation is completed is configured in such a way that a region below an up-down center is the widest, and a region on an upper side of this wide portion 27 (a vicinity slightly below the up-down center) is narrowed in such a way as to be significantly pinched, as shown in FIG. 11. This narrowly-formed narrow portion 28 is disposed in a position corresponding to the chest portion MB of the occupant MP (refer to FIG. 11). Further, in a state where the inflated bag main body 26 is seen from a front-rear direction side, a region from the wide portion 27 to a lower end (a front lower end 26b) side is configured in such a way that a width dimension in the left-right direction gradually decreases, and a region from the narrow portion 28 to an upper end 26a side is configured in such a way that a width dimension in the left-right direction gradually increases (refer to FIG. 11). Also, the bag main body 26 has a rear wall portion 37 and a lower wall portion 33 disposed on the occupant MP side when inflation is completed, a front wall portion 32 disposed on a front side separated from the occupant MP when inflation is completed, and a left wall portion 34 and right wall portion 35 disposed opposing on left-right direction sides when inflation is completed. A bending portion 38 is disposed in an up-down intermediate region of the rear wall portion 37. Further, the bag main body 26 is configured in such a way that the upper end 26a side when inflation is completed protrudes to the occupant MP side (rearward) (refer to FIGS. 5 and 12). The bending portion 38 is formed in a region of the narrow portion 28 of the bag main body 26, as shown in FIG. 11. Also, a vent hole 40 through which excess inflating gas that has flowed into the interior can be discharged is formed in the left wall portion 34 and the right wall portion 35. Specifically, each of the vent holes 40 is formed in positions below up-down centers of the left wall portion 34 and the right wall portion 35, on a front edge side.

In the bag main body 26 of the embodiment, a lower face 33a of the lower wall portion 33 configures a supported face 43 that comes into contact with a thigh portion MT of the occupant MP, and is supported by the thigh portion MT, when the upper body MU of the occupant MP is received by the bag main body 26 when inflation is completed (refer to FIG. 12). The bag main body 26 is in communication with the conduit portion 50 via a communication hole 41 in a region on a rear lower end 26c side (a region on a rear end side of the lower wall portion 33) when inflation is completed. The supported face 43 is configured of a region of the lower wall portion 33 farther to the front side than the conduit portion 50 (a base portion side region 51). In a state of the bag main body 26 before receiving the occupant when inflation is completed, the lower wall portion 33 (the supported face 43) is disposed inclined forward and downward (refer to FIG. 12). In the case of the embodiment, the communication hole 41 that causes the conduit portion 50 and the bag main body 26 to communicate opens in a circular form, and two thereof are aligned on left-right direction sides (refer to FIGS. 4 and 6).

Also, the rear wall portion 37 of the bag main body 26 when inflation is completed configures an upper body restraining face 44 that can restrain the upper body MU of the occupant MP when inflation is completed (refer to FIG. 12). The upper body restraining face 44 includes a lower side restraining face 44b which can restrain from an abdomen portion MA to the chest portion MB, and an upper side restraining face 44a which can restrain a head portion MH or a shoulder portion MS (the head portion MH in the case of the embodiment) of the occupant MP. Also, in the bag main body 26 of the embodiment, the bending portion 38 is disposed in a boundary region between the upper side restraining face 44a (an upper side region 37a) and the lower side restraining face 44b (a lower side region 37b) of the rear wall portion 37. The upper side restraining face 44a (the upper side region 37a) is disposed in such a way as to be caused to protrude to the occupant MP side (the rear side) with respect to the lower side restraining face 44b (the lower side region 37b) by the bending portion 38 when inflation of the bag main body 26 is completed (refer to FIGS. 5 and 12). In the case of the embodiment, the bending portion 38 is configured of a region of a tuck portion 39 formed by pinching regions of the rear wall portion 37 separated on up-down direction sides, and causing the regions to join each other.

Figure 6:
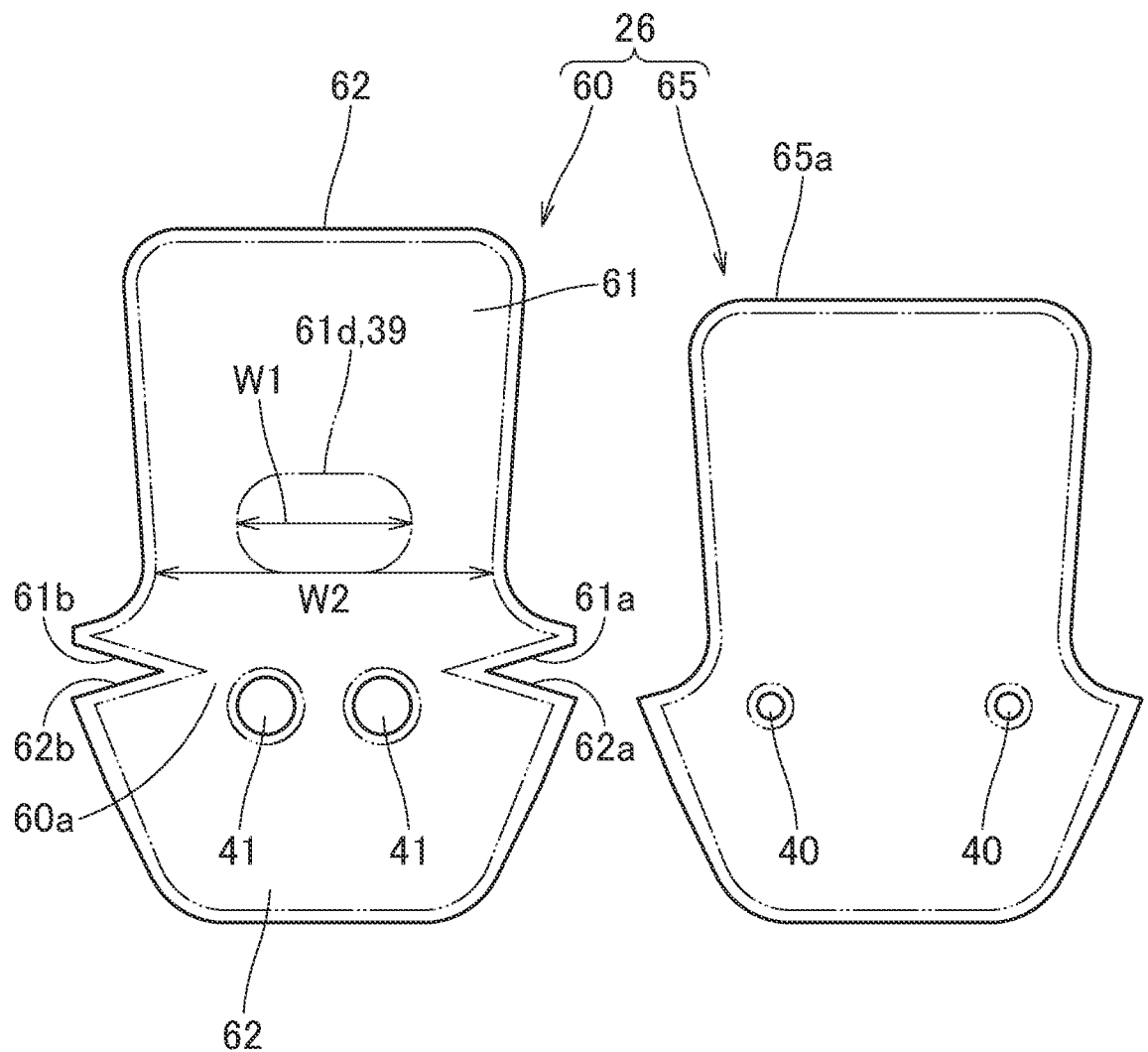
FIG. 6 is a plan view in which base materials configuring the airbag of FIG. 4 are arrayed.
Figure 6:
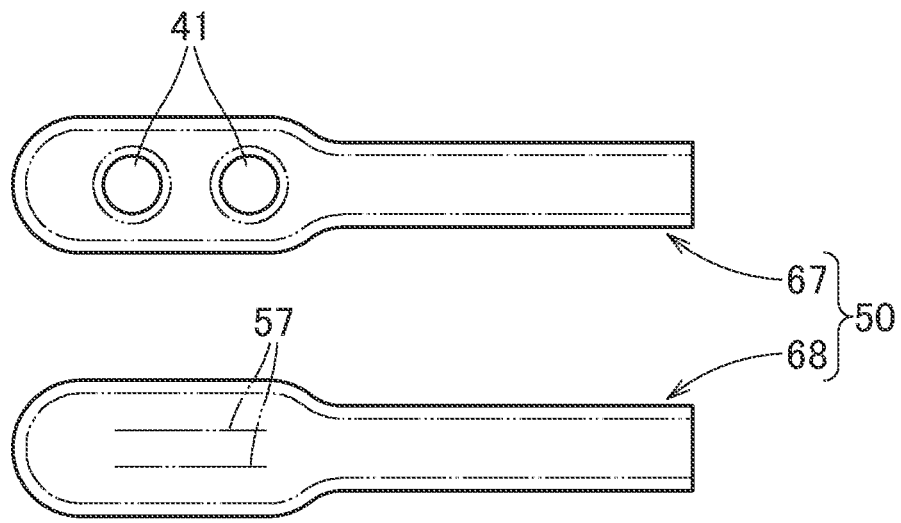
Figure 7:
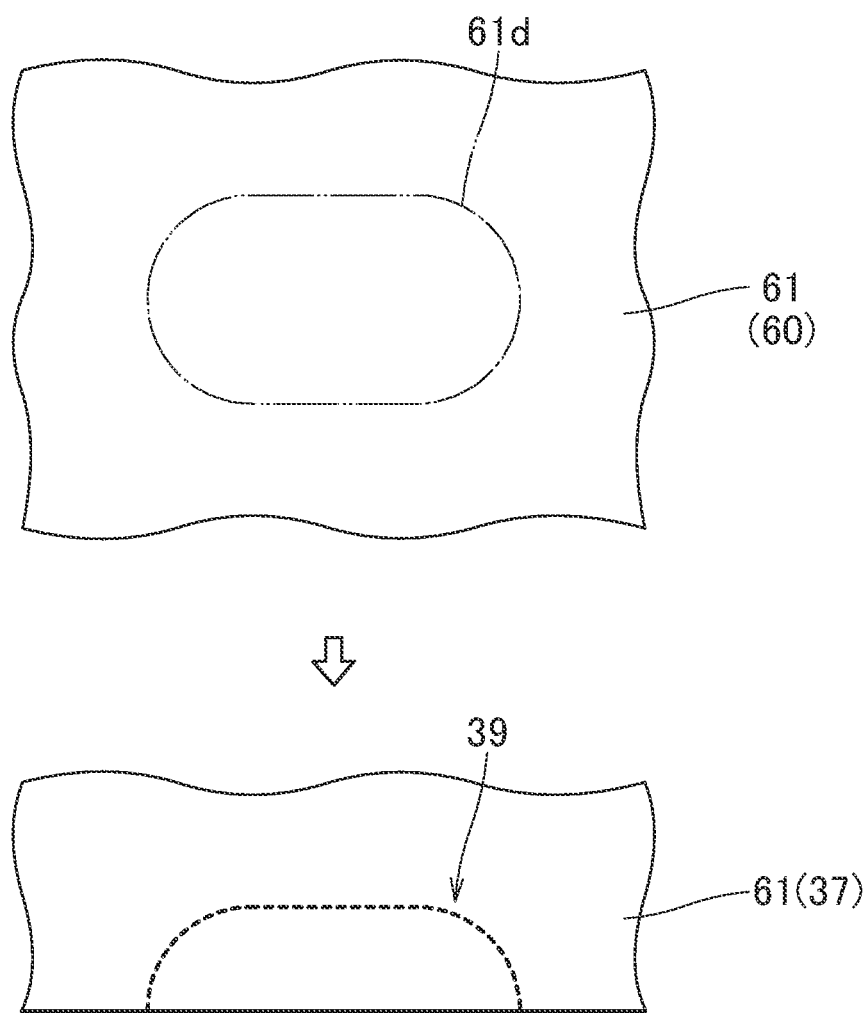
FIG. 7 is a schematic view illustrating a process of forming a tuck portion in the airbag of FIG. 4.

Specifically, in a state where an upper side region 61 of an occupant side panel 60, to be described hereafter, configuring the rear wall portion 37 is flattened, the tuck portion 39 is formed in a region of a future tuck formation portion 61d of an approximately oval form that approximately follows the left-right direction (refer to FIG. 6). As shown in FIG. 7, the tuck portion 39 can be formed by partially pinching the upper side region 61, folding the upper side region 61 into two portions, and joining the portions of the upper side region 61 (the rear wall portion 37) to each other by sewing (joining) the future tuck formation portion 61d. In the case of the embodiment, the tuck portion 39 is formed in such a way as to protrude to the front of the rear wall portion 37 (to an inner side of the bag main body 26) (refer to FIG. 5). As heretofore described, the tuck portion 39 is disposed in a region of the narrow portion 28 of the bag main body 26 when inflation is completed, in other words, disposed in front of the chest portion MB of the occupant MP (refer to FIGS. 11 and 12). Also, in the case of the embodiment, a width dimension W1 in left-right direction of the tuck portion 39 (the future tuck formation portion 61d) is set to be in the region of one-half of a width dimension W2 in left-right direction of a region of the narrow portion 28 in a state where the rear wall portion 37 (the upper side region 61 of the occupant side panel 60) is flattened (refer to FIG. 6).

The bag main body 26 of the embodiment is such that in a vertical cross-section approximately following the front-rear direction in a state where the bag main body 26 is inflated alone, an angle of intersection α between tangents of the upper side restraining face 44a (the upper side region 37a of the rear wall portion 37) and the lower side restraining face 44b (the lower side region 37b of the rear wall portion 37) is set to be in the region of 130° (refer to FIG. 5). Also, an angle of intersection β between tangents of the lower wall portion 33 (the supported face 43) and the lower side region 37b (the lower side restraining face 44b) in a state where the bag main body 26 is inflated alone is set to be in the region of 130° (refer to FIG. 5). Also, in the embodiment, a width dimension in front-rear direction on the lower end side of the bag main body 26 when inflation is completed is set to be a dimension such that a front end of the lower wall portion 33 (the front lower end 26b of the bag main body 26) is positioned slightly behind a knee MK of the occupant MP. A width dimension in up-down direction on a rear end side of the bag main body 26 when inflation is completed is set to be a dimension such that the upper end 26a (the upper end of the rear wall portion 37) is positioned in front of the head portion MH of the occupant MP (refer to FIG. 12). Also, a width dimension in left-right direction of the bag main body 26 when inflation is completed is smaller than the backrest portion 2 of the seat 1, and set in such a way that a wide region is approximately equivalent to the upper body MU (refer to FIG. 11). According to this kind of bag main body 26, the upper body MU of the occupant MP can be protected stably.

The conduit portion 50 is configured in such a way as to extend leftward from the bag main body 26. The conduit portion 50 is of an approximately tubular form in which a leading end side is opened, and is connected to the pipe portion 19 of the inflator 17. The conduit portion 50 is disposed approximately following the left-right direction in such a way as to approximately follow the lap belt 10 when inflation of the airbag 25 is completed. The conduit portion 50 includes the base portion side region 51 disposed on a lower face side of the bag main body 26 and a leading end side region 52 which is disposed on the left of the bag main body 26. The leading end side region 52 is connected to the inflator 17. The base portion side region 51 is set wider than a leading end side region 52. The communication holes 41 communicating with the bag main body 26 are formed in the base portion side region 51 of the conduit portion 50. In the embodiment, the conduit portion 50 and the bag main body 26 are linked by peripheral edge regions of the communication hole 41 being sewn together. The airbag 25 of the embodiment is attached to the lap belt 10 by the base portion side region 51 of the conduit portion 50 being sewn directly to the lap belt 10 (refer to FIG. 5). Also, the conduit portion 50 is of a configuration that includes an upper wall portion 54 and a lower wall portion 55 disposed opposing on up-down direction sides, or more specifically, a region on the base portion side of the lower wall portion 55 (a region configuring the base portion side region 51) is sewn to the lap belt 10 using sewing thread. In the case of the embodiment, a stitching region 57 in which the lap belt 10 and the conduit portion 50 are sewn together is formed in a double line form approximately along a length direction of the lap belt 10 (refer to two-dotted chain lines in FIGS. 4 and 7).

The airbag 25 of the embodiment is configured by peripheral edges of a base fabric of a predetermined form being joined together. In the case of the embodiment, the airbag 25 is configured of the occupant side panel 60 and a front side panel 65, which configure the bag main body 26, and two conduit portion panels 67 and 68 that configure the conduit portion 50, as shown in FIG. 6. Each of the occupant side panel 60, the front side panel 65, and the conduit portion panels 67 and 68 is formed of a woven fabric having flexibility formed of a polyester thread, a polyamide thread, or the like.

The occupant side panel 60 is disposed on the occupant MP side when inflation is completed, and mainly configures a region from the rear wall portion 37 to the lower wall portion 33. Specifically, the occupant side panel 60 includes the upper side region 61 which mainly configures the rear wall portion 37, and a lower side region 62 that mainly configures the lower wall portion 33. Further, the occupant side panel 60 is of an external form such that the upper side region 61 and the lower side region 62 are linked in a region configuring the rear lower end 26c side of the bag main body 26. The upper side region 61 configures the rear wall portion 37 and rear side regions of the left wall portion 34 and the right wall portion 35. The lower side region 62 configures the lower wall portion 33 and regions on a lower side of the left wall portion 34 and the right wall portion 35. The front side panel 65 mainly configures a region of the front wall portion 32 (specifically, the front wall portion 32 and regions on a front side of the left wall portion 34 and the right wall portion 35) of the bag main body 26 when inflation is completed. An external form of the front side panel 65 in a flattened state is configured in such a way as to approximately coincide with the lower side region 62 and the upper side region 61 in a state opened in such a way that edge portions (an upper edge 61c and the front edge 62c), remaining after a lower left edge 61a and a rear left edge 62a, and a lower right edge 61b and a rear right edge 62b, disposed on a left and right of a linking region 60a in which the upper side region 61 and the lower side region 62 are caused to link in the occupant side panel 60 are joined, are separated from each other. The front side panel 65 and the occupant side panel 60 each have bilaterally symmetrical forms. Further, as heretofore described, the bag main body 26 of the embodiment is formed as a bag by the upper edge 61c and the front edge 62c of the occupant side panel 60 and an outer peripheral edge 65a of the front side panel 65 being caused to join, in a state where the lower left edge 61a and the rear left edge 62a, and the lower right edge 61b and the rear right edge 62b, are joined to each other.

The two conduit panels 67 and 68 are of the same external form, and configure the upper wall portion 54 and the lower wall portion 55 respectively of the conduit portion 50.

Figure 8A:
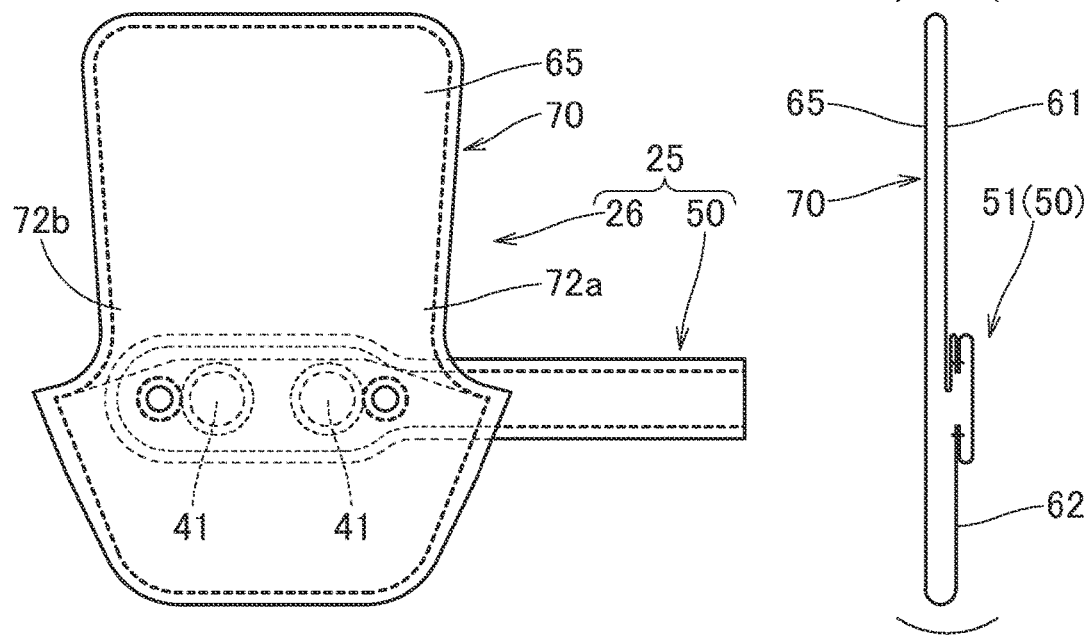
FIGS. 8A to 8C are schematic views illustrating a process of folding the airbag of FIG. 4.
Figure 8B:
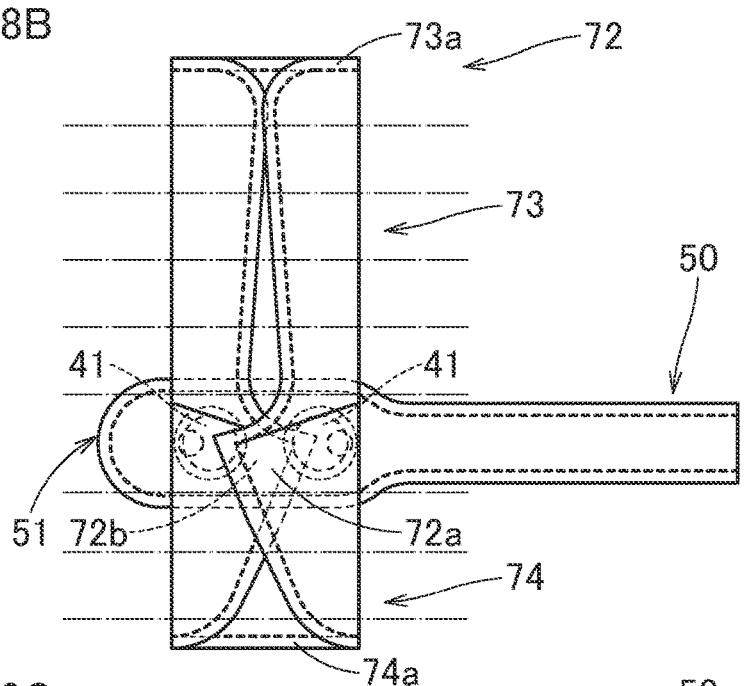
Figure 8C:
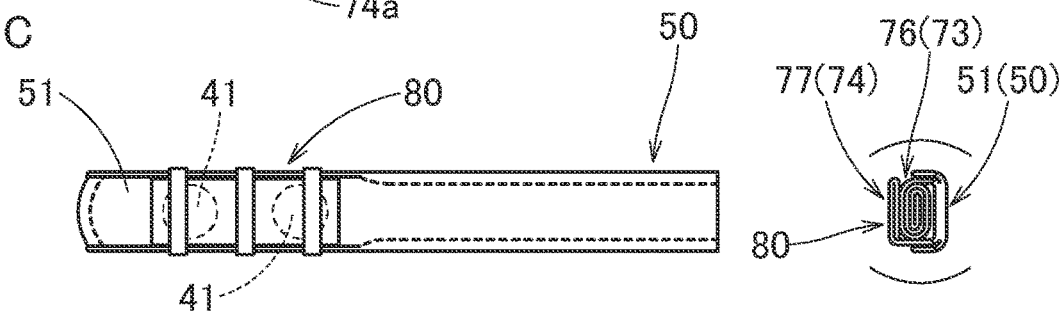

Next, a folding of the airbag 25 of the embodiment will be described. The airbag 25 is held in the lap belt 10 in the state of the completely folded body 80, which is formed by a preliminary folded bag 70 folded in such a way as to flatten the bag main body 26 being folded via a left-right reduction folding which reduces a width dimension in left-right direction, and a front-rear reduction folding which reduces a width dimension in front-rear direction. The preliminary folded bag 70 is formed by being stacked on the occupant side panel 60 (the rear wall portion 37 and the lower wall portion 33) while being flattened over an approximate whole of a region of the front side panel 65 (the front wall portion 32). Specifically, the preliminary folded bag 70 is formed in such a way as to be flattened over a whole region of the front side panel 65 by applying a fold approximately along the left-right direction over the whole left-right region, which is folded in a region of the upper side region 61 of the occupant side panel 60 over the whole left-right region (refer to FIG. 8A). Subsequently, a left-right reduction fold whereby each of a left edge 70a side and a right edge 70b side of the preliminary folded bag 70 is folded back to the front side panel 65 side (a side separated from the occupant) is carried out, thereby forming a left-right reduced folded bag 72. The left-right reduced folded bag 72 is such that the left edge 70a side and the right edge 70b side of the preliminary folded bag 70 are stacked one on the other. Specifically, the preliminary folded bag 70 is folded by forming a fold approximately following the front-rear direction in a vicinity of an edge of the communication hole 41, as shown in FIG. 8B, and the left edge 70a and the right edge 70b are stacked in a region of a wide portion. Subsequently, the left-right reduced folded bag 72 is folded using a front-rear reduction folding such that reduces a width dimension in front-rear direction. Specifically, as shown in FIGS. 8B and 8C, an upper side rolled region 76 is formed by an upper side region 73 which is a region upper side (rear side) of the conduit portion 50 (the base portion side region 51) in the left-right reduced folded bag 72, being wound from an upper edge 73a toward the front side panel 65 side (the front wall portion 32 side). The upper side rolled region 76 is placed on the base portion side region 51 of the conduit portion 50. In the same way, a lower side rolled region 77 is formed by a lower side region 74 which is a region lower side (front side) of the conduit portion 50 in the left-right reduced folded bag 72, being wound from a lower edge 74a side toward the front side panel 65 side (the front wall portion 32 side). The bag main body 26 can be folded by the lower side rolled region 77 being stacked on the upper side rolled region 76. Further, the completely folded body 80 formed by folding the bag main body 26 in this way is such that, in a state stacked on the base portion side region 51 of the conduit portion 50, as shown in FIG. 8C, a tape member (whose reference sign is omitted from the drawing), which is for preventing an unraveling and which can be ruptured, is wound around a periphery of a predetermined place together with the base portion side region 51, whereby the folded state is maintained. Further, the completely folded body 80, in a state held in the lap belt 10 by the base portion side region 51 of the conduit portion 50 being sewn to the lap belt 10, is disposed in a region of the lap belt 10, with a periphery covered by the cover 22 together with the lap belt 10.

The occupant protection device S of the embodiment is such that when the inflator 17 operates in a state where the occupant MP is seated while wearing the seatbelt 7 in the seat 1 mounted in a vehicle, inflating gas discharged from the inflator 17 flows into the bag main body 26 via the conduit portion 50. Further, the bag main body 26 completes inflation while protruding forward and upward from the lap belt 10 in such a way as to cause the cover 22 to rupture, as shown by a two-dotted chain line in FIG. 3 and in FIGS. 11 and 12.

Figure 9A:
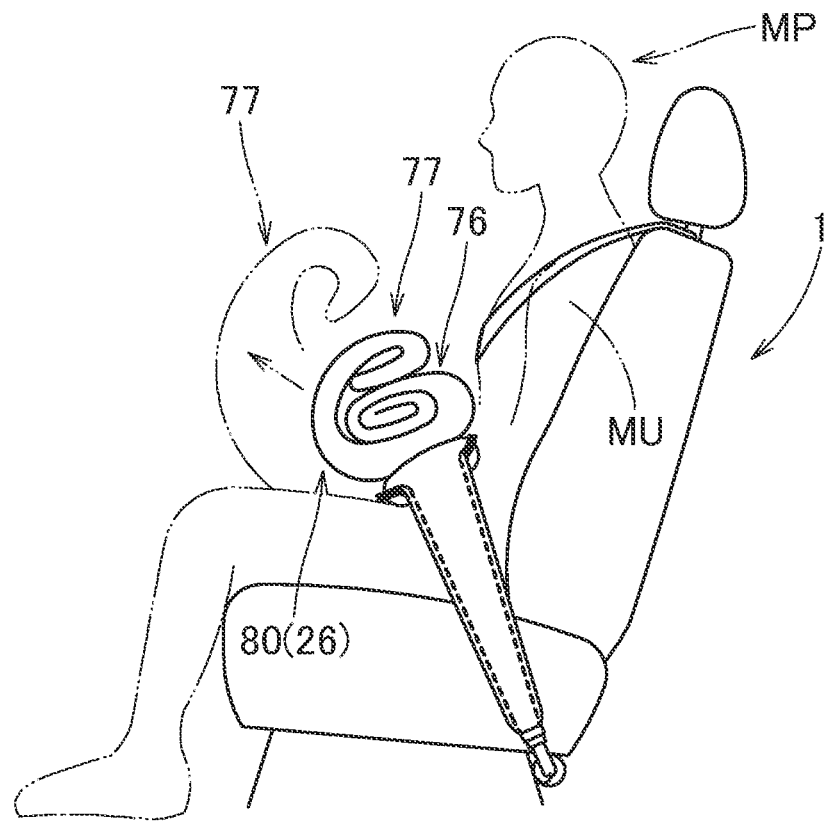
FIGS. 9A and 9B are schematic views illustrating a process of inflating an airbag in the occupant protection device of the embodiment.
Figure 9B:
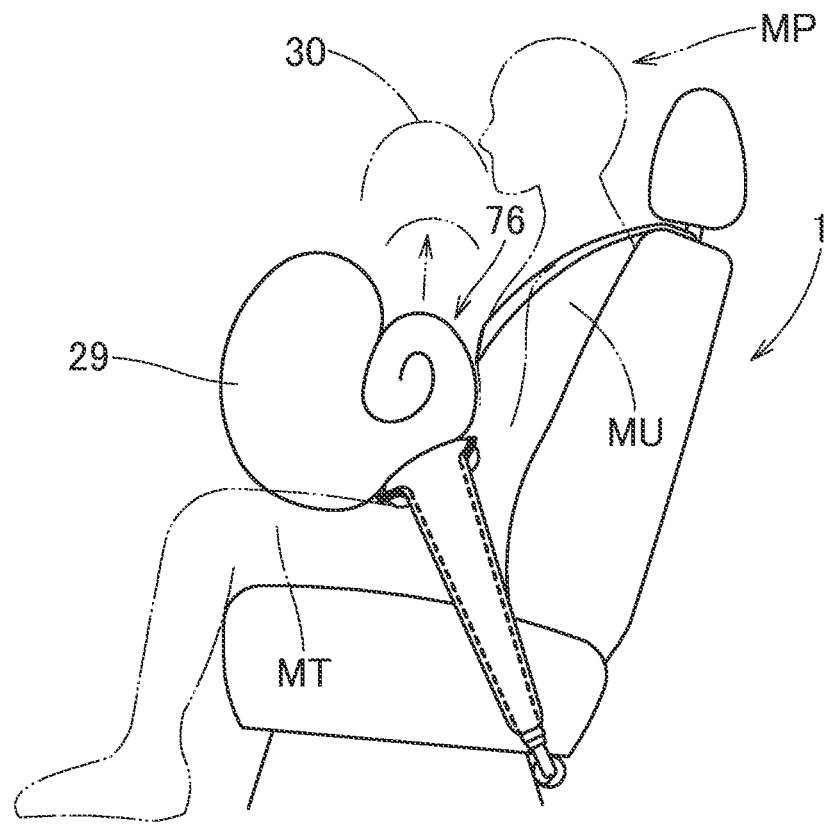
Figure 10A:
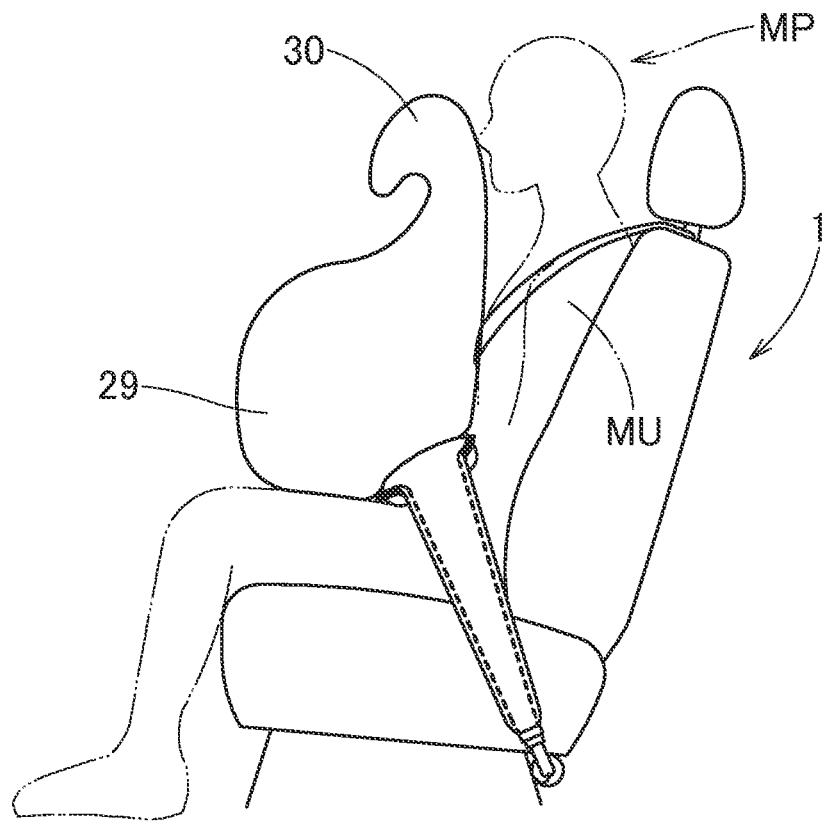
FIGS. 10A and 10B are schematic views illustrating a process of inflating an airbag, and are views illustrating a process after FIG. 9B.
Figure 10B:
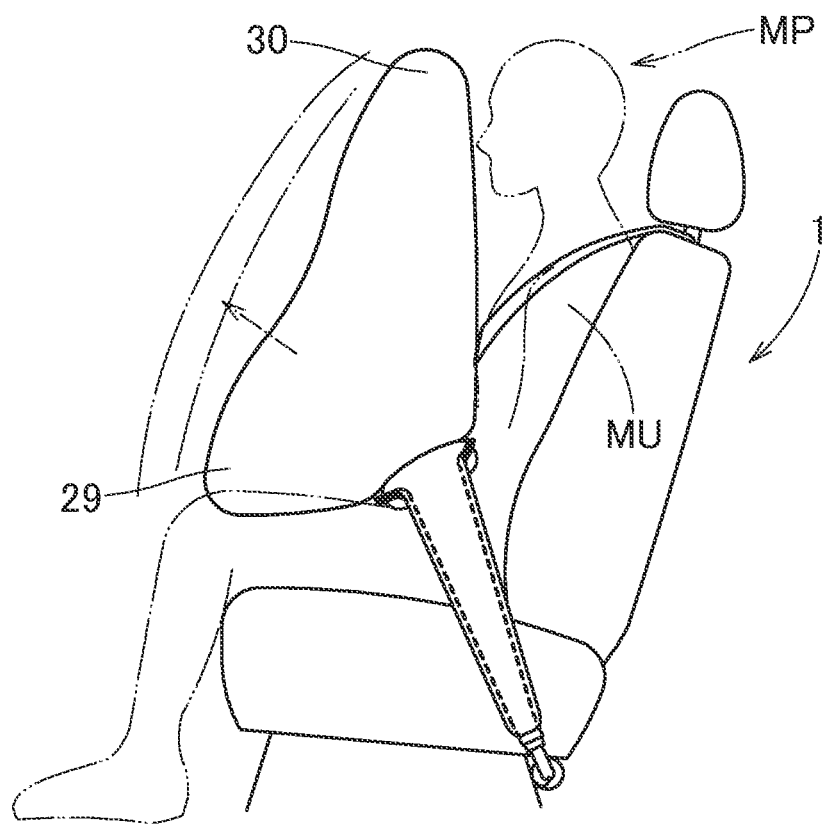

Further, the occupant protection device S of the embodiment is such that the bag main body 26 of the airbag 25 is held in a folded state in the lap belt 10 acting as a holding body. Specifically, the folded bag main body 26 is such that the lower side rolled region 77 formed by folding the lower side region 74 of the preliminary folded bag 70, lower than the conduit portion 50 (that is, a region on the lower wall portion 33, which is a region of front side than the conduit portion 50, at the inflated bag main body 26, is stacked on an upper side of the upper side rolled region 76 formed by folding the upper side region 73 of the preliminary folded airbag 70, upper than the conduit portion 50 (that is, a region on the rear wall portion 37 side of the inflated bag main body 26. Further, in an initial stage of inflation of the airbag 25, when the bag main body 26 inflates while inflating gas discharged from the inflator 17 is caused to flow into the interior via the conduit portion 50 and the communication hole 41, an aspect is such that the inflating gas flowing into the interior from the communication hole 41 pushes up the lower side rolled region 77 and the upper side rolled region 76. At this time, the lower side rolled region 77 stacked on the upper side, firstly, starts to inflate in such a way as to unravel the folding while protruding forward and upward from the lap belt 10, thereafter the upper side rolled region 76 starts to inflate in such a way as to unravel the folding. To describe the behavior of this development of the bag main body 26 in detail, firstly, the lower side rolled region 77 starts to inflate, while unraveling the folding, owing to inflating gas being caused to flow into the interior, as shown in FIGS. 9A and 9B, but the lower side rolled region 77 is restricted from protruding significantly forward. This is because the lower side rolled region 77 is formed in such a way as be wound toward the front wall portion 32 side (the front side panel 65 side). Further, a front lower side region 29 of the bag main body 26 formed by the lower side rolled region 77 inflates on the thigh portion MT of the occupant MP while protruding forward and upward, as shown in FIG. 9B. Next, the upper side rolled region 76 inflates in such a way as to protrude upward between the front lower side region 29 and the upper body MU of the occupant MP (refer to FIG. 9B). The upper side rolled region 76 is also restricted from protruding excessively toward the occupant MP (upper body MU) side. This is because the upper side rolled region 76 is also formed in such a way as be wound toward the front wall portion 32 side (the front side panel 65 side). That is, the occupant protection device S of the embodiment is such that a region (the front lower side region 29) on a front lower side (the front lower end 26b side) of the bag main body 26 is of an aspect such as to inflate first while unraveling the folding, and a region (an upper side region 30) on a rear upper side (the upper end 26a side) disposed on the front side of the upper body MU of the occupant MP in the inflated bag main body 26 is of an aspect such that protruding forward in such a way as to separate from the occupant MP is regulated by the previously inflating front lower side region 29. Because of this, the upper side region 30 can be caused to inflate in a position of proximity on the front side of the upper body MU of the occupant MP by being caused to protrude upward (refer to FIGS. 10A and 10B). As a result of this, the front side of the upper body MU of the occupant MP can be covered swiftly by the inflated bag main body 26, and the shoulder portion MS, the head portion MH, and the like of the occupant MP can be restrained swiftly.

Consequently, the occupant protection device S of the embodiment is such that the upper body MU of the occupant MP can be protected swiftly by the completely inflated airbag 25.

Although the occupant protection device S of the embodiment is of a configuration such that the upper body MU of the occupant MP is protected swiftly by the inflated airbag 25 (the bag main body 26), the bag main body 26 is configured in such a way that the bending portion 38 is disposed in an up-down intermediate region of the rear wall portion 37 (a region protecting the chest portion MB), and the upper side restraining face 44a (the upper side region 37a) farther to the upper side than the bending portion 38 is caused to protrude to the occupant MP side (rearward) than the lower side restraining face 44b (the lower side region 37b) farther to the lower side than the bending portion 38. This means that even when a configuration is such that inflation of the bag main body 26 is swift in a position of proximity on the front side of the upper body MU of the occupant MP, the inflating bag main body 26 immediately coming into contact with the chest portion MB of the occupant MP can be restricted. That is, the bag main body 26 exerting an unnecessary degree of pressing force on the chest portion MB can be restricted, and the upper body MU can be restrained gently.

Also, the occupant protection device S of the embodiment is such that the bag main body 26 is of a configuration folded via a left-right reduction folding such that reduces the width dimension in the left-right direction of the preliminary folded bag 70, followed by a front-rear reduction folding. The left-right reduced folded bag 72 is of a configuration formed by the left edge 70a side and the right edge 70b side of the preliminary folded bag 70 being stacked one on the other. Because of this, the completely folded body 80 formed by the bag main body 26 being folded can be formed compactly left to right. As a result of this, even when, for example, the completely folded body 80 is disposed in a position deviating slightly to a left-right direction side with respect to the seat 1 due to a difference in physique of an occupant seated on the seat, an effect of this kind of positional deviation can be restricted. Further, the bag main body 26 can be caused to inflate swiftly, without being affected by the seat 1 or the like. When this kind of point is not taken into consideration, a configuration in which a preliminary folded bag is folded without carrying out a left-right reduction folding may be adopted. Also, even when folding via a left-right reduction folding, a configuration in which folding is slight to an extent that a left edge side and a right edge side of a preliminary folded bag are not stacked one on the other may be adopted.

The occupant protection device S of the embodiment is such that the lap belt 10 of the seatbelt 7 is utilized as a holding body in which the airbag 25 is caused to be held. However, a holding body in which an airbag is caused to be held is not limited to a lap belt. For example, a configuration in which a holding body separate from a seatbelt is provided, and an airbag is caused to be held in the holding body, may be adopted. In the occupant protection device S of the embodiment, while a configuration is such that the airbag 25 is caused to be held in the lap belt 10 of the seatbelt 7, the inflator 17 operates later (in the region of 5 ms) than an operation of the pretensioner mechanism of the seatbelt 7. Because of this, the airbag 25 can be caused to inflate in a state where a seated state of the occupant MP with respect to the seat 1 is stably maintained by the seatbelt 7, and the occupant MP can be stably protected by the airbag 25 and the seatbelt 7.

Also, the occupant protection device S of the embodiment is such that the seatbelt 7 and the inflator 17 are of a configuration mounted in the seat 1. This means that even when used in a state where the seat 1 is moved with respect to the vehicle by being significantly slid to the front or rear or rotated, the occupant MP seated in the seat 1 can be appropriately protected by the airbag 25. Of course, an occupant protection device of the present disclosure not being limited to the seat 1 of this kind of configuration, the occupant protection device can also be mounted in a type of seat in which an occupant is restrained by a seatbelt such that a retractor is provided on a vehicle body side. Also, a configuration in which an inflator is also attached on the vehicle body side may be adopted.

The present disclosure relates to an occupant protection device of the following configuration.

An occupant protection device for protecting an occupant seated on a seat includes the following:
an inflator;
a holding body disposed in a periphery of a hip portion of the occupant; and
an airbag that is held in the holding body and has a bag main body, which inflates while protruding forward and upward from the holding body, whose external form when inflation is completed is an approximate triangular prism form whose axial direction approximately follows a left-right direction, and which is disposed in such a way as to cover a front of the occupant when inflation is completed; and a conduit portion, which is connected to the inflator, and causes an inflating gas discharged from the inflator to flow into the bag main body via a communication hole, wherein
the bag main body has a front wall portion which is disposed on a front side separated from the occupant when inflation is completed, and a rear wall portion and a lower wall portion which are disposed on the occupant side when inflation is completed; and is of a configuration held in the holding body in a state of a completely folded body folded using a front-rear reduction folding such that a width dimension in front-rear direction is reduced from a state of a preliminary folded bag disposed in such a way as to be stacked on the rear wall portion and the lower wall portion while a region of the front wall portion is flatted over approximately a whole region, and
the completely folded body is formed by a lower side rolled region which is formed by a lower side region forming a side of the preliminary folded bag lower than the conduit portion being wound from a lower edge side toward the front wall portion side, being stacked on an upper side rolled region which is formed by an upper side region forming a side of the preliminary folded bag upper than the conduit portion being wound from an upper edge side toward the front wall portion side.

The occupant protection device of the embodiment is such that a bag main body of an airbag is held in a folded state in a holding body. Specifically, the folded bag main body is such that a lower side rolled region formed by a lower side region, which is a region of a preliminary folded bag lower side (front side) than a conduit portion (that is, a region of a lower wall portion side of the inflated bag main body) being folded, is stacked on an upper side of an upper side rolled region formed by an upper side region, which is a region of a preliminary folded bag upper side (rear side) than the conduit portion (that is, a region of a rear wall portion side of the inflated bag main body) being folded. Further, when the bag main body inflates while inflating gas discharged from an inflator is caused to flow into an interior via the conduit portion and a communication hole, an aspect is such that the inflating gas flowing into the interior from the communication hole pushes up the lower side rolled region and the upper side rolled region. At this time, the lower side rolled region stacked on the upper side, firstly, starts to inflate in such a way as to unravel the folding while protruding forward and upward from the holding body, thereafter the upper side rolled region starts to inflate in such a way as to unravel the folding. That is, the occupant protection device of the embodiment is such that a region on a front lower side of the bag main body is of an aspect such as to inflate first while unraveling the folding, and a region on a rear upper side disposed on a front side of an upper body of an occupant when inflation is completed is of an aspect such that protruding forward in such a way as to separate from the occupant is regulated by the previously inflating front lower side region. Because of this, a region on a rear upper side of the bag main body can be caused to inflate in a position of proximity on the front side of the upper body of the occupant by being caused to protrude upward. As a result of this, the front side of the upper body of the occupant can be covered swiftly by the inflated bag main body, and a shoulder portion, a head portion, and the like of the occupant can be restrained swiftly.

Consequently, the occupant protection device of the present disclosure is such that the upper body of the occupant can be protected swiftly by the completely inflated airbag.

Also, the occupant protection device of the present disclosure is preferably such that the bag main body is of a configuration folded via a left-right reduction folding such that reduces a width dimension in the left-right direction of a preliminary folded bag, followed by a front-rear reduction folding, and a left-right reduced folded bag is of a configuration formed by a left edge side and a right edge side of the preliminary folded bag being stacked one on the other.

By the occupant protection device being configured in this way, a completely folded body can be formed compactly left to right, meaning that even when, for example, the completely folded body is disposed in a position deviating slightly to a left-right direction side with respect to a seat due to a difference in physique of an occupant seated on the seat, an effect of this kind of positional deviation can be restricted, and the bag main body can be caused to inflate swiftly, without being affected by the seat or the like.

What is claimed is:
1. An occupant protection device for protecting an occupant seated on a seat, comprising:
an inflator;
a holding body disposed in a periphery of a hip portion of the occupant; and
an airbag that is held in the holding body and has
a bag main body,
which inflates while protruding forward and upward from the holding body, whose external form when inflation is completed is an approximate triangular prism form whose axial direction approximately follows a left-right direction, and
which is disposed in such a way as to cover a front of the occupant when inflation is completed; and
a conduit portion, which is connected to the inflator, and causes an inflating gas discharged from the inflator to flow into the bag main body via a communication hole, wherein
the bag main body
has a front wall portion which is disposed on a front side separated from the occupant when inflation is completed, and a rear wall portion and a lower wall portion which are disposed on the occupant side when inflation is completed, and
is of a configuration held in the holding body in a state of a completely folded body folded using a front-rear reduction folding such that
a width dimension in front-rear direction is reduced from a state of a preliminary folded bag disposed in such a way as to be stacked on the rear wall portion and the lower wall portion while a region of the front wall portion is flatted over approximately a whole region, and the completely folded body is formed by a lower side rolled region, which is formed by a lower side region forming a side of the preliminary folded bag lower than the conduit portion being wound from a lower edge side toward the front wall portion side, being stacked on an upper side rolled region which is formed by an upper side region forming a side of the preliminary folded bag upper than the conduit portion being wound from an upper edge side toward the front wall portion side.

2. The occupant protection device according to claim 1, wherein the bag main body is of a configuration folded via a left-right reduction folding such that reduces a width dimension in the left-right direction of the preliminary folded bag, followed by a front-rear reduction folding, and a left-right reduced folded bag is formed by a left edge side and a right edge side of the preliminary folded bag being stacked one on the other.

3. The occupant protection device according to claim 1, wherein the bag main body is configured in such a way that a bending portion is disposed in an up-down intermediate region of the rear wall portion, and an upper side region positioned farther to an upper side than the bending portion when inflation is completed is caused to protrude to the occupant side with respect to a lower side region positioned farther to a lower side than the bending portion.

4. The occupant protection device according to claim 1, wherein the holding body is configured of a lap belt that restrains the hip portion of the occupant when a seat belt is worn, and a cover which covers the folded airbag.

5. The occupant protection device according to claim 4, wherein the seatbelt and the inflator are of a configuration mounted in the seat.

* * * * *